(12) United States Patent
Potter et al.

(10) Patent No.: US 9,637,602 B2
(45) Date of Patent: May 2, 2017

(54) BOPP FILM WITH IMPROVED STIFFNESS/TOUGHNESS BALANCE

(71) Applicant: BOREALIS AG, Vienna (AT)

(72) Inventors: Gregory Potter, Linz (AT); Dietrich Gloger, Linz (AT); Thomas Horill, Gerasdorf (AT); Antonis Gitsas, Linz (AT); Franciscus Jacobs, Evergem (BE); Matthew Parkinson, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/101,837

(22) PCT Filed: Dec. 18, 2014

(86) PCT No.: PCT/EP2014/078524
§ 371 (c)(1),
(2) Date: Jun. 3, 2016

(87) PCT Pub. No.: WO2015/091839
PCT Pub. Date: Jun. 25, 2015

(65) Prior Publication Data
US 2016/0304681 A1  Oct. 20, 2016

(30) Foreign Application Priority Data
Dec. 18, 2013 (EP) .................................. 13198134

(51) Int. Cl.
| | | |
|---|---|---|
| C08F 210/16 | (2006.01) | |
| B29C 55/00 | (2006.01) | |
| C08J 5/18 | (2006.01) | |
| B29C 55/12 | (2006.01) | |
| B29C 55/10 | (2006.01) | |
| B29K 23/00 | (2006.01) | |
| B29L 7/00 | (2006.01) | |

(52) U.S. Cl.
CPC .............. *C08J 5/18* (2013.01); *B29C 55/10* (2013.01); *B29C 55/12* (2013.01); *B29K 2023/14* (2013.01); *B29L 2007/008* (2013.01); *C08F 210/16* (2013.01); *C08J 2323/12* (2013.01); *C08J 2323/14* (2013.01)

(58) Field of Classification Search
CPC  C08F 210/16; C08F 2500/26; C08F 2800/20; C08L 23/16; B29C 55/12
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,693,838 A | 12/1997 | Sangokoya et al. |
| 5,731,253 A | 3/1998 | Sangokoya |
| 5,731,451 A | 3/1998 | Smith et al. |

(Continued)

FOREIGN PATENT DOCUMENTS

| | | |
|---|---|---|
| EP | 0 045 977 B1 | 1/1987 |
| EP | 0 260 130 A1 | 3/1988 |

(Continued)

OTHER PUBLICATIONS

U.S. Appl. No. 14/911,295, filed Feb. 10, 2016.
U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.

(Continued)

*Primary Examiner* — Rip A Lee
(74) *Attorney, Agent, or Firm* — Leydig, Voit & Mater, Ltd.

(57) ABSTRACT

The present invention relates to a new biaxially oriented polypropylene (BOPP) film, a process for the preparation of such film as well as the use of a polypropylene for the preparation of such film and an article comprising such film.

16 Claims, No Drawings

(56) References Cited

U.S. PATENT DOCUMENTS

| | | | |
|---|---|---|---|
| 5,744,656 A | 4/1998 | Askham | |
| 6,316,562 B1 | 11/2001 | Munck et al. | |
| 6,586,528 B1 | 7/2003 | Delaite et al. | |
| 6,642,317 B1 | 11/2003 | Delaite et al. | |
| 7,342,078 B2 | 3/2008 | Schottek et al. | |
| 7,569,651 B2 | 8/2009 | Schottek et al. | |
| 9,512,246 B2 * | 12/2016 | Neissl | C08F 210/06 |
| 2003/0149199 A1 | 8/2003 | Schottek et al. | |
| 2004/0033349 A1 | 2/2004 | Henderson | |
| 2005/0136274 A1 | 6/2005 | Hamulski et al. | |
| 2005/0187367 A1 | 8/2005 | Hori et al. | |
| 2005/0200046 A1 | 9/2005 | Breese | |
| 2006/0020096 A1 | 1/2006 | Schottek et al. | |
| 2006/0182987 A1 | 8/2006 | Yu et al. | |
| 2006/0211801 A1 | 9/2006 | Miller et al. | |
| 2007/0235896 A1 | 10/2007 | McLeod et al. | |
| 2008/0214767 A1 | 9/2008 | Mehta et al. | |
| 2010/0029883 A1 | 2/2010 | Krajete et al. | |
| 2010/0081760 A1 | 4/2010 | Rhee et al. | |
| 2010/0099824 A1 | 4/2010 | Helland et al. | |
| 2011/0031645 A1 | 2/2011 | Kuettel et al. | |
| 2012/0189830 A1 | 7/2012 | Niepelt et al. | |
| 2015/0152203 A1 * | 6/2015 | Neissl | C08L 23/14 |
| | | | 526/66 |
| 2015/0191556 A1 * | 7/2015 | Neissl | C08F 2/001 |
| | | | 526/66 |
| 2016/0185946 A1 | 6/2016 | Sandholzer et al. | |
| 2016/0194486 A1 | 7/2016 | Sandholzer et al. | |
| 2016/0200838 A1 | 7/2016 | Reznichenko et al. | |
| 2016/0208085 A1 * | 7/2016 | Gloger | C08L 23/12 |
| 2016/0229158 A1 | 8/2016 | Cavacas et al. | |
| 2016/0237270 A1 | 8/2016 | Wang et al. | |
| 2016/0244539 A1 | 8/2016 | Resconi et al. | |
| 2016/0280899 A1 | 9/2016 | Töltsch et al. | |

FOREIGN PATENT DOCUMENTS

| | | |
|---|---|---|
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594 218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 1 358 252 B1 | 4/2012 |
| EP | 2 308 923 B1 | 5/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| WO | WO 87/07620 A1 | 12/1987 |
| WO | WO 92/12182 A1 | 7/1992 |
| WO | WO 92/13029 A1 | 8/1992 |
| WO | WO 92/19653 A1 | 11/1992 |
| WO | WO 92/19658 A1 | 11/1992 |
| WO | WO 92/19659 A1 | 11/1992 |
| WO | WO 92/21705 A1 | 12/1992 |
| WO | WO 93/11165 A1 | 6/1993 |
| WO | WO 93/11166 A1 | 6/1993 |
| WO | WO 93/19100 A1 | 9/1993 |
| WO | WO 94/10180 A1 | 5/1994 |
| WO | WO 94/14856 A1 | 7/1994 |
| WO | WO 95/12622 A1 | 5/1995 |
| WO | WO 95/32994 A1 | 12/1995 |
| WO | WO 97/10248 A1 | 3/1997 |
| WO | WO 97/14700 A1 | 4/1997 |
| WO | WO 97/28170 A1 | 8/1997 |
| WO | WO 97/36939 A1 | 10/1997 |
| WO | WO 98/12234 A1 | 3/1998 |
| WO | WO 98/16359 A1 | 4/1998 |
| WO | WO 98/38041 A1 | 9/1998 |
| WO | WO 98/40331 A1 | 9/1998 |
| WO | WO 98/46616 A1 | 10/1998 |
| WO | WO 98/47929 A1 | 10/1998 |
| WO | WO 98/49208 A1 | 11/1998 |
| WO | WO 98/56831 A1 | 12/1998 |
| WO | WO 98/58971 A1 | 12/1998 |
| WO | WO 98/58976 A1 | 12/1998 |
| WO | WO 98/58977 A1 | 12/1998 |
| WO | WO 99/10353 A1 | 3/1999 |
| WO | WO 99/12981 A1 | 3/1999 |
| WO | WO 99/19335 A1 | 4/1999 |
| WO | WO 99/24478 A1 | 5/1999 |
| WO | WO 99/24479 A1 | 5/1999 |
| WO | WO 99/33842 A1 | 7/1999 |
| WO | WO 99/41290 A1 | 8/1999 |
| WO | WO 00/34341 A2 | 6/2000 |
| WO | WO 00/68315 A1 | 11/2000 |
| WO | WO 01/48034 A2 | 7/2001 |
| WO | WO 01/58970 A1 | 8/2001 |
| WO | WO 01/70395 A2 | 9/2001 |
| WO | WO 02/02576 A1 | 1/2002 |
| WO | WO 02/051912 A1 | 7/2002 |
| WO | WO 02/057342 A2 | 7/2002 |
| WO | WO 03/000754 A1 | 1/2003 |
| WO | WO 03/000755 A2 | 1/2003 |
| WO | WO 03/000756 A2 | 1/2003 |
| WO | WO 03/000757 A1 | 1/2003 |
| WO | WO 03/051934 A2 | 6/2003 |
| WO | WO 03/054035 A1 | 7/2003 |

(56) References Cited

FOREIGN PATENT DOCUMENTS

| | | |
|---|---|---|
| WO | WO 03/066698 A1 | 8/2003 |
| WO | WO 03/082879 A1 | 10/2003 |
| WO | WO 2004/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/053644 A1 | 5/2010 |
| WO | WO 2010/082943 A1 | 7/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/050119 A1 | 4/2013 |
| WO | WO 2013/092615 A1 | 6/2013 |
| WO | WO 2013/092620 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |

OTHER PUBLICATIONS

U.S. Appl. No. 15/113,907, filed Jul. 25, 2016.
U.S. Appl. No. 15/113,922, filed Jul. 25, 2016.
U.S. Appl. No. 15/115,929, filed Aug. 2, 2016.
"Glossary of Basic Terms in Polymer Science (IUPAC Recommendations 1996)," *Pure Appl. Chem.*, 68(8):1591-1595 (1996).
"MDO Film—Oriented PE and PP packaging film," IN0128/GB FF 2004 10, Borealis A/S (2004).
Abiru et al., "Microstructural Characterisation of Propylene-Butene-1 Copolymer Using Temperature Rising elution Fractionation," *J. Appl. Polymer Sci* 68:1493-1501 (1998).
Atwood, "Chapter 6: Anionic and Cationic Organoaluminum Compounds," *Coord. Chem. Alum.*, VCH, New York, NY, pp. 197-232 (1993).
Britovsek et al., "The Search for New-Generation Olefin Polymerization Catalysts: Life beyond Metallocenes," *Angew. Chem, Int. Ed.*, vol. 38(4), pp. 428-447 (1999).
Busico et al., "Alk-1-ene Polymerization in the Presence of a Monocyclopentadienyl Zirconium(IV) Acetamidinate Catalyst: Microstructural and Mechanistic Insights," *Macromol. Rapid Commun.* 28:1128-1134 (2007).
Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Castignolles et al., "Detection and quantification of branching in polyacrylates by size-exclusion chromatography (SEC) and melt-state $^{13}$C NMR spectroscopy," *Polymer*, 50(11):2373-2383, (2009).
Cheng, "$^{13}$C NMR Analysis of Ethylene-Propylene Rubbers," *Macromolecules* 17:1950-1955 (1984).
Cimmino et al., "Thermal and mechanical properties of isotactic random propylene-butene-1 copolymers," *Polymer* 19:1222-1223 (1978).
Crispino et al., "Influence of Composition on the Melt Crystallization of Isotactic Random Propylene/1-Butene Copolymers," *Makromol. Chem.* 181:1747-1755 (1980).
Filip et al., "Heteronuclear decoupling under fast MAS by a rotor-synchronized Hahn-echo pulse train," *J. Magnet. Reson.* 176:239-243 (2005).
Fujiyama et al., "Effect of Molecular Parameters on the Shrinkage of Injection-Molded Polypropylene," *J. Appl. Polym. Sci.* 22:1225-1241 (1978).
Gahleitner et al., "Nucleation of Polypropylene Homo- and Copolymers," *International Polymer Processing* 26(1):2-20 (2011).
Galli et al., "Technology: driving force behind innovation and growth of polyolefins," *Prog. Polym. Sci.* 26:1287-1336 (2001).
Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).
Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198—S208 (2007).
Holbrey et al.; "Liquid clathrate formation in ionic liquid-aromatic mixtures," *Chem. Comm.*, 2003, pp. 476-477.
Kakugo et al., "$^{13}$C NMR Determination of Monomer Sequence Distribution in Ethylene-Propylene Copolymers Prepared with δ-TiCl$_3$-Al(C$_2$H$_5$)$_2$Cl," *Macromolecules* 15:1150-1152 (1982).
Klimke et al., "Optimisation and Application of Polyolefin Branch Quantification by Melt-State $^{13}$C NMR Spectroscopy," *Macromol. Chem. Phys.* 207(4):382-395 (2006).
McAuley et al., "On-line Inference of Polymer Properties in an Industrial Polyethylene Reactor," *AIChE Journal*, vol. 37, No. 6, pp. 825-835 (1991).
Myhre et al., "Oriented PE films—Expanding Opportunities with Borstar® PE," Maack Speciality Films, pp. 1-10 (2001).
Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).
Periodic Table (IUPAC 2007).
*Plastics Additives Handbook*, 5th edition, Hans Zweifel, Editor, Hanser Publishers, Munich, pp. 871-873 (2001).
*Plastics Additives Handbook*, 5th edition, Hans Zweifel, Editor, Hanser Publishers, Munich, pp. 956-965 (2001).

(56) References Cited

OTHER PUBLICATIONS

Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

*Propylene Handbook*, 2nd Edition, Chapter 7.2.2 "Oriented Films," pp. 405-415, Nello Pasquini, Editor, Hanser (2005).

Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).

Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).

Resconi et al., "Highly Regiospecific Zirconocene Catalysts for the Isospecific Polymerization of Propene," *JACS* 120(10):2308-2321 (1998).

Resconi et al., "Selectivity in Propene Polymerization with Metallocene Catalysts," *Chem. Rev.* 100(4):1253-1345 (2000).

Singh et al., "Triad sequence determination of ethylene-propylene copolymers—application of quantitative $^{13}$C NMR," *Polymer Testing* 28(5):475-479 (2009).

Spaleck et al., "The Influence of Aromatic Substituents on the Polymerization Behavior of Bridged Zirconocene Catalysts," *Organometallics* 13:954-963 (1994).

Spear et al., "Liquid Clathrates," *Encyclopedia of Supramolecular Chemistry*, J.L. Atwood and J.W. Steed (Eds.); Marcel Dekker: New York, pp. 804-808 (2004).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}$C NMR," *J. Magnet. Reson.* 187:225-233 (2007).

"Polyethylene Lumicene® mPE M5510 EP," Total Refining & Chemicals, Total Ecosolutions, Belgium, Aug. 2013 (2 pgs.).

European Patent Office, International Search Report in International Application No. PCT/EP2014/078524 (Mar. 10, 2015).

European Patent Office, Written Opinion in International Application No. PCT/EP2014/078524 (Mar. 10, 2015).

International Bureau of WIPO, International Preliminary Report on Patentability in International Application No. PCT/EP2014/078524 (Jun. 21, 2016).

\* cited by examiner

BOPP FILM WITH IMPROVED STIFFNESS/TOUGHNESS BALANCE

CROSS-REFERENCE TO RELATED APPLICATIONS

This patent application is the U.S. national phase of International Application No. PCT/EP2014/078524, filed on Dec. 18, 2014, which claims the benefit of European Patent Application No. 13198134.2, filed Dec. 18, 2013, the disclosures of which are incorporated herein by reference in their entireties for all purposes.

The present invention relates to a new biaxially oriented polypropylene (BOPP) film, a process for the preparation of such film as well as the use of a polypropylene for the preparation of such film and an article comprising such film.

Biaxially oriented polypropylene (BOPP) films, also known as oriented polypropylene films, are used in a wide variety of technical applications such as packaging, tapes or capacitor films. Desired properties of these polypropylene films are typically high stiffness in combination with some flexibility and toughness, i.e. the BOPP film should have high modulus of elasticity as well as high elongation at break. However, due to the production of the BOPP film by sequential drawing in two orthogonal directions, at two different temperatures, the BOPP film processing introduces considerable anisotropy regarding these mechanical properties of the final BOPP film. To increase the stiffness, i.e. the modulus of elasticity, of the final BOPP film it was up to now necessary to increase the isotacticity and melting point of the base resin used for preparing the BOPP film. At the same time, however, the increase in isotacticity and melting point typically reduces the toughness, i.e. the elongation at break, of the BOPP film prepared from such resin.

Thus, there is still a need in the art for providing a biaxially oriented polypropylene (BOPP) film which avoids the foregoing disadvantages and especially allows for improving the mechanical properties of such a film. In other words, it would be desirable to provide a biaxially oriented polypropylene (BOPP) film featuring favourable mechanical properties like high stiffness and high toughness compared to prior art biaxially oriented polypropylene (BOPP) films.

Accordingly, it is an object of the present invention to provide a biaxially oriented polypropylene (BOPP) film featuring an improved balance of mechanical properties like stiffness and toughness. In particular, the final film should have a high modulus of elasticity as well as a high elongation at break.

Accordingly, the present invention is directed in a first aspect to a biaxially oriented polypropylene (BOPP) film, wherein the biaxially oriented polypropylene (BOPP) film has a) a modulus of elasticity in transverse direction (TD) of at least 5 000 N/mm², and b) an elongation at break in machine direction (MD) of at least 170%, and wherein the polypropylene (PP) is a random polypropylene copolymer (C-PP) having i) a melting temperature ($T_m$) measured by differential scanning calorimetry (DSC) in the range of from 164 to 169° C., ii) a xylene cold soluble fraction (XCS) determined at 25° C. according to ISO 16152 in the range of from 1.0 to 3.5 wt.-%, and iii) a content of ethylene units in the range from 0.01 to 0.5 wt.-%, based on the total weight of the random polypropylene copolymer (C-PP).

Preferably the values for the modulus of elasticity in transverse direction (TD) and the elongation at break in machine direction (MD) are obtained if the polypropylene (PP) when drawn in transverse direction has a drawing temperature (T 1 in the range of the (Tdraw') draw', inequation (II)

$$Tm-25 \leq Tdraw' \leq Tm+10 \qquad (II),$$

wherein

Tdraw' is the drawing temperature ($T_{draw'}$) in ° C. of the first segment of the drawing zone (DZT) in the oven where the polypropylene (PP) is drawn in transverse direction, wherein further this first segment of the drawing zone (DZT) is defined as the zone where the draw ratio of the drawn polypropylene (PP) is at least 1.1, preferably is in the range of 1.1 to 5.0, more preferably is in the range 1.1 to 4.0, yet more preferably is in the range of 1.1 to 3.5; and Tm is the melting temperature ($T_m$) of the polypropylene (PP) in ° C.

The inventors surprisingly found out that the foregoing biaxially oriented polypropylene (BOPP) film has an improved balance of mechanical properties compared to prior art biaxially oriented polypropylene films. More precisely, the inventors found out that the biaxially oriented polypropylene (BOPP) film has high stiffness in combination with high toughness, i.e. the BOPP film has high modulus of elasticity as well as high elongation at break.

According to a second aspect, the present invention is directed to a process for the preparation of a biaxially oriented polypropylene (BOPP) film, the process comprises at least the steps of a) providing a polypropylene (PP) being a random polypropylene copolymer (C-PP) as defined herein, b) stretching the polypropylene of step a) in machine direction (MD) and transverse direction (TD), wherein the stretching in machine direction (MD) and transverse direction (TD) is carried out in consecutive steps.

It is preferred that step b) is carried out in that the polypropylene of step a) is stretched a) in machine direction (MD) with a draw ratio of ≥3.0, preferably ≥4.0, and/or b) in transverse direction (TD) with a draw ratio of ≥6.0, preferably ≥7.0.

In a third aspect, the present invention is directed to the use of the polypropylene (PP) being a random polypropylene copolymer (C-PP) as defined herein for the preparation of a biaxially oriented polypropylene (BOPP) film. It is preferred that the biaxially oriented polypropylene (BOPP) film has a) a modulus of elasticity in transverse direction (TD) of at least 5 000 N/mm² and b) an elongation at break in machine direction (MD) of at least 170%, preferably these values for the modulus of elasticity in transverse direction (TD) and the elongation at break in machine direction (MD) are obtained if the polypropylene (PP) when drawn in transverse direction has a drawing temperature ($T_{draw'}$) in the range of the inequation (II)

$$Tm-25 \leq Tdraw' \leq Tm+10 \qquad (II),$$

wherein

Tdraw' is the drawing temperature ($T_{draw'}$) in ° C. of the first segment of the drawing zone (DZT) in the oven where the polypropylene (PP) is drawn in transverse direction, wherein further this first segment of the drawing zone (DZT) is defined as the zone where the draw ratio of the drawn polypropylene (PP) is at least 1.1, preferably is in the range of 1.1 to 5.0, more preferably is in the range 1.1 to 4.0, yet more preferably is in the range of 1.1 to 3.5; and Tm is the melting temperature ($T_m$) of the polypropylene (PP) in ° C.

According to a fourth aspect, the present invention is directed to an article comprising the biaxially oriented polypropylene (BOPP) film as defined herein.

In one embodiment of the present invention, the biaxially oriented polypropylene (BOPP) film has a) a modulus of elasticity in machine direction (MD) of at least 2 000 N/mm² and/or b) an elongation at break in transverse direction (TD) of at least 46%, preferably these values for the modulus of elasticity in machine direction (MD) and the elongation at break in transverse direction (TD) are obtained if the polypropylene (PP) when drawn in transverse direction has a drawing temperature ($T_{draw'}$) in the range of the inequation (II)

$$Tm-25 \leq Tdraw' \leq Tm+10 \qquad (II),$$

wherein

Tdraw' is the drawing temperature ($T_{draw'}$) in °C. of the first segment of the drawing zone (DZT) in the oven where the polypropylene (PP) is drawn in transverse direction, wherein further this first segment of the drawing zone (DZT) is defined as the zone where the draw ratio of the drawn polypropylene (PP) is at least 1.1, preferably is in the range of 1.1 to 5.0, more preferably is in the range 1.1 to 4.0, yet more preferably is in the range of 1.1 to 3.5; and Tm is the melting temperature ($T_m$) of the polypropylene (PP) in °C.

In another embodiment of the present invention, the biaxially oriented polypropylene (BOPP) film has a tensile strength in machine direction (MD) of at least 110 N/mm² and/or a tensile strength in transverse direction (TD) of at least 300 N/mm², preferably these values for the tensile strength in machine direction (MD) and the tensile strength in transverse direction (TD) are obtained if the polypropylene (PP) when drawn in transverse direction has a drawing temperature ($T_{draw'}$) in the range of the inequation (II)

$$Tm-25 \leq Tdraw' \leq Tm+10 \qquad (II),$$

wherein

Tdraw' is the drawing temperature ($T_{draw'}$) in °C. of the first segment of the drawing zone (DZT) in the oven where the polypropylene (PP) is drawn in transverse direction, wherein further this first segment of the drawing zone (DZT) is defined as the zone where the draw ratio of the drawn polypropylene (PP) is at least 1.1, preferably is in the range of 1.1 to 5.0, more preferably is in the range 1.1 to 4.0, yet more preferably is in the range of 1.1 to 3.5; and Tm is the melting temperature ($T_m$) of the polypropylene (PP) in °C.

In yet another embodiment of the second aspect of the present invention, the biaxially oriented polypropylene (BOPP) film comprises a polypropylene (PP) being a random polypropylene copolymer (C-PP) having a) a crystallization temperature ($T_c$) measured by differential scanning calorimetry (DSC) of at least 115° C., preferably of at least 118° C., and/or b) a melt flow rate $MFR_2$ (230° C.) measured according to ISO 1133 of ≤7.0 g/10 min, preferably of ≤5.0 g/10 min, and/or c) an mmmm pentad content of ≥95.0%, preferably in the range of from 95.0 to 98.0% determined by ¹³C NMR spectroscopy, and/or d) 2,1 erythro regio-defects of below 1.0%, preferably below 0.5%, more preferably below 0.3% determined by ¹³C NMR spectroscopy.

Wherever in the instant invention the amount of defects, i.e. 2,1 erythro regio-defects and stereo-defects, are reported as "%" the average percentage of said units in the sample.

In one embodiment of the present invention, the biaxially oriented polypropylene (BOPP) film comprises a polypropylene (PP) being a random polypropylene copolymer (C-PP) having a comonomer corrected meso sequence length (MSL4') in the range of 130 to 250 as determined by the following formula (IV)

$$MSL4'=(((1-fE*5))*[mmmm])/$$
$$(((1-(fE*5))*0.5*[mmmr])+(0.5*2*fE)))+4 \qquad (IV).$$

In yet another embodiment of the present invention, the biaxially oriented polypropylene (BOPP) film comprises a polypropylene (PP) being a random polypropylene copolymer (C-PP) having a ratio of weight average molecular weight ($M_w$) to number average molecular weight ($M_n$) [$M_w/M_n$] of at least 4.0, preferably of at least 5.0.

In one embodiment of the present invention, the biaxially oriented polypropylene (BOPP) film comprises a polypropylene (PP) being a random polypropylene copolymer (C-PP) having a polydispersity index of ≥2.5.

In another embodiment of the present invention, the biaxially oriented polypropylene (BOPP) film has a) a draw ratio in machine direction (MD) of ≥3.0, preferably ≥4.0, and/or b) a draw ratio in transverse direction (TD) of ≥6.0, preferably ≥7.0.

In yet another embodiment of the present invention, the biaxially oriented polypropylene (BOPP) film has been obtained by a process as defined herein.

It should be understood that for the purposes of the present invention, the following terms have the following meaning:

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

When in the following reference is made to preferred embodiments or technical details of the inventive biaxially oriented polypropylene (BOPP) film, it is to be understood that these preferred embodiments and technical details also refer to the inventive process for the preparation of such a biaxially oriented polypropylene (BOPP) film, the inventive use of the polypropylene as well as to the article defined herein and vice versa (as far as applicable). If, for example, it is set out that the polypropylene (PP) of the biaxially oriented polypropylene (BOPP) film comprises a polypropylene (PP) being a random polypropylene copolymer (C-PP), also the polypropylene (PP) of the inventive process, the inventive use as well as the inventive article comprises a polypropylene (PP) being a random polypropylene copolymer (C-PP).

In the following the invention will be described in more detail.

It is one requirement of the present invention that the biaxially oriented polypropylene (BOPP) film comprises a polypropylene (PP) as defined in the instant invention. Accordingly, the biaxially oriented polypropylene (BOPP) film preferably comprises at least 80.0 wt.-%, more preferably comprises at least 95.0 wt.-%, yet more preferably consists of, the polypropylene (PP). The biaxially oriented polypropylene (BOPP) film may contain additives, like antioxidants and/or calcium stearate, but preferably no other polymer than the polypropylene (PP). Thus, the remaining part up to 100.0 wt.-% may be accomplished by additives known in the art, like antioxidants and/or calcium stearate. Therefore, it is preferred that, this remaining part, i.e. the part being not the polypropylene (PP), shall be not more than 5.0 wt.-%, preferably not more than 2.0 wt.-%, like not more than 1.0 wt.-%, within the biaxially oriented polypropylene (BOPP) film.

In one preferred embodiment of the present invention, the biaxially oriented polypropylene (BOPP) film contains as polymer component the polypropylene (PP), whereas the remaining part up to 100.0 wt.-% constitute typical additives but no other polymer.

The term "biaxially oriented polypropylene (BOPP) film" indicates that the film is a biaxially oriented film, i.e. the polypropylene (PP) as defined below has been subjected to a stretching process obtaining thereby a biaxially oriented polymer. As indicated above, the biaxially oriented polypropylene (BOPP) film preferably contains the polypropylene (PP) as only polymer and thus it is preferably a biaxially oriented polypropylene (BOPP) film made from said polypropylene (PP).

It is appreciated that the biaxially oriented polypropylene (BOPP) film features a high stiffness. Thus, it is one requirement of the present invention that the biaxially oriented polypropylene (BOPP) film has a modulus of elasticity in transverse direction (TD) of at least 5 000 N/mm². For example, the biaxially oriented polypropylene (BOPP) film has a modulus of elasticity in transverse direction (TD) of from 5 000 to 6 500 N/mm², like from 5 000 to 6 000 N/mm².

Additionally, the biaxially oriented polypropylene (BOPP) film features a high toughness. Thus, it is a further requirement of the present invention that the biaxially oriented polypropylene (BOPP) film has an elongation at break in machine direction (MD) of at least 170%. For example, the biaxially oriented polypropylene (BOPP) film has an elongation at break in machine direction (MD) of from 170 to 220%, like from 180 to 200%. In one embodiment, the biaxially oriented polypropylene (BOPP) film has an elongation at break in machine direction (MD) of from 180 to 220%, like from 200 to 220%.

In one embodiment of the present invention, the biaxially oriented polypropylene (BOPP) film also has a high modulus of elasticity in machine direction (MD). For example, the biaxially oriented polypropylene (BOPP) film has a modulus of elasticity in machine direction (MD) of at least 2 300 N/mm². Preferably, the biaxially oriented polypropylene (BOPP) film has a modulus of elasticity in machine direction (MD) of from 2 300 to 2 700 N/mm², like from 2 400 to 2 600 N/mm². In one embodiment of the present invention, the biaxially oriented polypropylene (BOPP) film comprising, preferably consisting of, a random polypropylene copolymer (C-PP) has a high modulus of elasticity in machine direction (MD). For example, the biaxially oriented polypropylene (BOPP) film comprising, preferably consisting of, a random polypropylene copolymer (C-PP) has a modulus of elasticity in machine direction (MD) of at least 2 000 N/mm². Preferably, the biaxially oriented polypropylene (BOPP) film comprising, preferably consisting of, a random polypropylene copolymer (C-PP) has a modulus of elasticity in machine direction (MD) of from 2 000 to 2 700 N/mm², like from 2 000 to 2 500 N/mm²

Additionally or alternatively, the biaxially oriented polypropylene (BOPP) film also has a high elongation at break in transverse direction (TD). For example, the biaxially oriented polypropylene (BOPP) film has an elongation at break in transverse direction (TD) of at least 46%. Preferably, the biaxially oriented polypropylene (BOPP) film has an elongation at break in transverse direction (TD) of from 46 to 60%, like from 47 to 56%. If the biaxially oriented polypropylene (BOPP) film comprises, preferably consists of, a random polypropylene copolymer (C-PP), the biaxially oriented polypropylene (BOPP) film preferably has an elongation at break in transverse direction (TD) of from 46 to 70%, like from 50 to 65%.

In one embodiment of the present invention, the biaxially oriented polypropylene (BOPP) film thus has
 a) a modulus of elasticity in transverse direction (TD) of at least 5 000 N/mm² and a modulus of elasticity in machine direction (MD) of at least 2 300 N/mm², and
 b) an elongation at break in machine direction (MD) of at least 170% and an elongation at break in transverse direction (TD) of at least 46%.

In another embodiment of the present invention, preferably if the biaxially oriented polypropylene (BOPP) film comprises, preferably consists of, a random polypropylene copolymer (C-PP), the biaxially oriented polypropylene (BOPP) film has
 a) a modulus of elasticity in transverse direction (TD) of at least 5 000 N/mm² and a modulus of elasticity in machine direction (MD) of at least 2 000 N/mm², and
 b) an elongation at break in machine direction (MD) of at least 170% and an elongation at break in transverse direction (TD) of at least 46%.

In combination with a high stiffness and high toughness, the biaxially oriented polypropylene (BOPP) film can have a high tensile strength. Thus, the biaxially oriented polypropylene (BOPP) film can have a tensile strength in machine direction (MD) of at least 155 N/mm², preferably from 155 to 200 N/mm², like from 160 to 190 N/mm², and/or a tensile strength in transverse direction (TD) of at least 300 N/mm², preferably from 300 to 500 N/mm², like from 350 to 450 N/mm²

For example, the biaxially oriented polypropylene (BOPP) film can have a tensile strength in machine direction (MD) of at least 155 N/mm², preferably from 155 to 200 N/mm², like from 160 to 190 N/mm², or a tensile strength in transverse direction (TD) of at least 300 N/mm², preferably from 300 to 500 N/mm², like from 350 to 450 N/mm². Alternatively, the biaxially oriented polypropylene (BOPP) film can have a tensile strength in machine direction (MD) of at least 155 N/mm², preferably from 155 to 200 N/mm², like from 160 to 190 N/mm², and a tensile strength in transverse direction (TD) of at least 300 N/mm², preferably from 300 to 500 N/mm², like from 350 to 450 N/mm².

If the biaxially oriented polypropylene (BOPP) film comprises, preferably consists of, a random polypropylene copolymer (C-PP), the biaxially oriented polypropylene (BOPP) film can have a tensile strength in machine direction (MD)

of at least 110 N/mm², preferably from 110 to 170 N/mm², like from 110 to 150 N/mm², and/or a tensile strength in transverse direction (TD) of at least 300 N/mm², preferably from 300 to 450 N/mm², like from 300 to 400 N/mm².

For example, the biaxially oriented polypropylene (BOPP) film comprising, preferably consisting of, a random polypropylene copolymer (C-PP) has a tensile strength in machine direction (MD) of at least 110 N/mm², preferably from 110 to 170 N/mm², like from 110 to 150 N/mm², or a tensile strength in transverse direction (TD) of at least 300 N/mm², preferably from 300 to 450 N/mm², like from 300 to 400 N/mm². Alternatively, the biaxially oriented polypropylene (BOPP) film comprising, preferably consisting of, a random polypropylene copolymer (C-PP) has a tensile strength in machine direction (MD) of at least 110 N/mm², preferably from 110 to 170 N/mm², like from 110 to 150 N/mm², and a tensile strength in transverse direction (TD) of at least 300 N/mm², preferably from 300 to 450 N/mm², like from 300 to 400 N/mm².

Concerning the preferred process conditions under which the values for the modulus of elasticity in transverse direction (TD) and in machine direction (MD), the elongation at break in machine direction (MD) and in transverse direction (TD), as well as the tensile strength in transverse direction (TD) and in machine direction (MD) for the biaxially oriented polypropylene (BOPP) film are obtained reference is made to the information provided below, especially to the inequations (I) to (III).

As the biaxially oriented polypropylene (BOPP) film is preferably prepared from the polypropylene (PP), as defined below, the properties given for the polypropylene (PP), are equally applicable for the biaxially oriented polypropylene (BOPP) film, if not specified differently.

The instant polypropylene (PP) of the biaxially oriented polypropylene (BOPP) film is preferably a random propylene copolymer (C-PP) or a propylene homopolymer (H-PP). In one preferred embodiment of the present invention, the biaxially oriented polypropylene (BOPP) film comprises a polypropylene (PP) being a propylene homopolymer (H-PP).

The expression propylene homopolymer (H-PP) used in the instant invention relates to a polypropylene that consists substantially, i.e. of at least 99.5 wt.-%, based on the total weight of the polypropylene, preferably of at least 99.6 wt.-%, more preferably of at least 99.8 wt.-%, of propylene units. In one embodiment of the present invention, only propylene units in the propylene homopolymer (H-PP) are detectable.

If the polypropylene (PP) is a random polypropylene copolymer (C-PP), it comprises monomers copolymerizable with propylene, i.e. α-olefins other than propylene, for example comonomers such as ethylene and/or $C_4$ to $C_{10}$ α-olefins, in particular ethylene and/or $C_4$ to $C_8$ α-olefins, e.g. 1-butene and/or 1-hexene. Preferably, the random polypropylene copolymer (C-PP) comprises, especially consists of, monomers copolymerizable with propylene from the group consisting of ethylene, 1-butene and 1-hexene. More specifically, the random polypropylene copolymer (C-PP) comprises—apart from propylene—units derivable from ethylene and/or 1-butene. In one embodiment of the present invention, the random polypropylene copolymer (C-PP) comprises units derivable from ethylene and propylene only.

The comonomer content in the random polypropylene copolymer (C-PP) is preferably relatively low, i.e. equal or below 5.0 wt.-%, based on the total weight of the random polypropylene copolymer (C-PP). In one embodiment of the present invention, the comonomer content is preferably between 0.5 wt.-% and 5.0 wt.-%, more preferably between 0.5 wt.-% and 4.0 wt.-%, even more preferably between 0.5 wt.-% and 3.5 wt.-% and most preferably between 1.0 wt.-% and 3.0 wt.-%, based on the total weight of the random polypropylene copolymer (C-PP).

In one embodiment, the comonomer content in the random polypropylene copolymer (C-PP) is in the range from 0.01 to 0.5 wt.-%, based on the total weight of the random polypropylene copolymer (C-PP). Preferably, the comonomer content is between 0.01 wt.-% and 0.4 wt.-%, more preferably between 0.05 wt.-% and 0.3 wt.-%, even more preferably between 0.1 wt.-% and 0.25 wt.-% and most preferably between 0.1 wt.-% and 0.25 wt.-%, based on the total weight of the random polypropylene copolymer (C-PP).

The instant polypropylene (PP) is a random polypropylene copolymer (C-PP).

Preferably, the polypropylene (PP) is isotactic. Accordingly, it is appreciated that the polypropylene (PP) has a rather high mmmm pentad content, i.e. ≥95.0%, determined by $^{13}C$ NMR spectroscopy. In one embodiment of the present invention, the polypropylene (PP) has an mmmm pentad content in the range of from 95.0 to 98.0%, as determined by $^{13}C$ NMR spectroscopy.

Preferably, the polypropylene (PP) has low amount of regio defects. Accordingly it is preferred that the polypropylene (PP) has 2,1 erythro regio-defects of below 1.0%, preferably below 0.5%, more preferably below 0.3% determined by $^{13}C$ NMR spectroscopy. In one specific embodiments no 2,1-erythro regio-defects are detectable.

One characteristic of the instant polypropylene (PP) is its low amounts of xylene cold solubles (XCS), i.e. of ≤3.5 wt.-%, more preferably in the range of 1.0 to 3.5 wt.-%, still more preferably in the range of 1.0 to 3.0 wt.-%. These values are especially applicable for the polypropylene (PP) being a propylene homopolymer (H-PP). The random polypropylene copolymer (C-PP) has an amount of xylene cold solubles (XCS) in the range of 1.0 to 3.5 wt.-%, preferably in the range of 1.0 to 3.0 wt.-%, more preferably in the range of 1.0 to 2.5 wt.-% and most preferably in the range of 1.0 to 2.0 wt.-%.

Additionally or alternatively, the polypropylene (PP) has a melt flow rate $MFR_2$ (230° C.) measured according to ISO 1133 of ≤7.0 g/10 min, and preferably of ≤5.0 g/10 min. For example, the polypropylene (PP) has a melt flow rate $MFR_2$ (230° C.) measured according to ISO 1133 in the range of 0.5 to 7.0 g/10 min, preferably in the range of 1.0 to 5.0 g/10 min, more preferably in the range of 1.5 to 5.0 g/10 min, and yet more preferably in the range of 1.5 to 4.0 g/10 min.

Preferably, the polypropylene (PP) is a crystalline polypropylene (PP). The term "crystalline" indicates that the polypropylene (PP), i.e. the propylene homopolymer (H-PP) or the random propylene copolymer (C-PP), has a rather high melting temperature. Accordingly, throughout the invention the propylene homopolymer (H-PP) or the random propylene copolymer (C-PP) is regarded as crystalline unless otherwise indicated.

Therefore, the polypropylene (PP) has preferably a $(T_m)$ as measured by differential scanning calorimetry (DSC) of at least 160° C., i.e. in the range of from 160 to 170° C., more preferably of at least 162° C., i.e. in the range of from 162 to 170° C., more preferably of at least 164° C., i.e. in the range of from 164 to 169° C. or in the range of from 164 to 168° C. These values are especially applicable for the polypropylene (PP) being a propylene homopolymer (H-PP). The random polypropylene copolymer (C-PP) has a $(T_m)$ as measured by differential scanning calorimetry (DSC) in the range of from 164 to 169° C., preferably in the range of from 164 to 168° C., like in the range of from 164 to 167° C.

In one embodiment of the present invention, the polypropylene (PP) has a rather high crystallization temperature (TO as measured by differential scanning calorimetry (DSC). Thus in this embodiment, the polypropylene (PP) has a crystallization temperature (TO measured by differential scanning calorimetry (DSC) of at least 115° C., preferably of at least 118° C., and more preferably of at least 120° C. Accordingly the polypropylene (PP) has a crystallization temperature ($T_c$) measured by differential scanning calorimetry (DSC) in the range of from 115 to 128° C., preferably in the range of from 118 to 128° C., and more preferably in the range of from 120 to 128° C.

Additionally or alternatively, the polypropylene (PP) being a random polypropylene copolymer (C-PP) has a comonomer corrected meso sequence length (MSL4') in the range of 130 to 250, preferably from 140 to 230 and most preferably from 140 to 210, as determined by the following formula (IV)

$$MSL4'=(((1-(fE*5))*[mmmm])/ (((1-(fE*5))*0.5*[mmmr])+(0.5*2*fE)))+4 \qquad (IV).$$

It is preferred that the polypropylene (PP) of the instant biaxially oriented polypropylene (BOPP) film has a ratio of weight average molecular weight ($M_w$) to number average molecular weight (Mn) [$Mw/M_n$] of at least 4.0. For example, the polypropylene (PP) has a ratio of weight average molecular weight ($M_w$) to number average molecular weight (MO [$Mw/M_n$] of at least 4.0, preferably of at least 5.0, preferably from 5.0 to 8.0, more preferably from 5.5 to 7.0.

Additionally or alternatively, the polypropylene (PP) of the instant biaxially oriented polypropylene (BOPP) film has a relatively low polydispersity index. In one embodiment of the present invention, the biaxially oriented polypropylene (BOPP) film comprises a polypropylene (PP) being a random polypropylene copolymer (C-PP) having a polydispersity index of ≥2.5, preferably of from 2.5 to 4.0 and most preferably from 3.0 to 4.0.

In one embodiment of the present invention, the biaxially oriented polypropylene (BOPP) film has a draw ratio of ≥3.0 times, preferably ≥4.0 times, in machine direction (MD) and/or ≥6.0 times, preferably ≥7.0 times, in transverse direction (TD). For example, the biaxially oriented polypropylene (BOPP) film has a draw ratio of from 3.0 to 7.0 or 4.0 to 6.0 times in machine direction (MD), and/or from 6.0 to 12.0 or 7.0 to 11.0 times in transverse direction (TD). Preferably, the biaxially oriented polypropylene (BOPP) film has a draw ratio of from 3.0 to 7.0 or 4.0 to 6.0 times in machine direction (MD) and from 6.0 to 12.0 or 7.0 to 11.0 times in transverse direction (TD).

The polypropylene (PP) being a random polypropylene copolymer (C-PP) is subjected to a film forming process. Any film forming process which is suitable for the preparation of a biaxially oriented polypropylene (BOPP) film can be used.

It is preferred that the biaxially oriented polypropylene (BOPP) film has been obtained by a process as defined below.

Accordingly, another aspect of the present invention is directed to a process for the preparation of a biaxially oriented polypropylene (BOPP) film, the process comprising at least the steps of a) providing the polypropylene (PP) being a random polypropylene copolymer (C-PP) as defined above,
b) stretching the polypropylene of step a) in machine direction (MD) and transverse direction (TD), wherein the stretching in machine direction (MD) and transverse direction (TD) is carried out in consecutive steps, and wherein preferably the stretching (drawing) in transverse direction is accomplished under the conditions set out below in more detail.

The biaxially oriented polypropylene (BOPP) film can be prepared by conventional stretching (drawing) processes known in the art. Accordingly, the process for the preparation of the biaxially oriented polypropylene (BOPP) film according to this invention comprises the use of the polypropylene (PP) being a random polypropylene copolymer (C-PP) as defined herein and its forming into a film preferably by the tenter method known in the art.

The tenter method is in particular a method in which the polypropylene (PP) being a random polypropylene copolymer (C-PP) as defined herein is melt extruded from a slit die such as a T-die and cooled on a cooling drum obtaining an undrawn sheet. Typically the cooling drum (chill roll) has a temperature in the range of 80 to 110° C., more preferably in the range of 85 to 100° C., still more preferably in the range of 85 to 95° C., like in the range of 88 to 92° C. Said sheet is pre-heated for example with heated metal rolls and then stretched (drawn) in the length direction between a plurality of rolls over which a difference in peripheral speeds is established. Preferably the difference between the lowest and highest roll speed is 35 to 60 m/min, more preferably 40 to 55 m/min, still more preferably 44 to 52 m/min, wherein the highest roll speed is preferably in the range of 50 to 70 m/min, more preferably in the range of 55 to 65 m/min, like in the range of 57 to 62 m/min and then both edges are gripped with grippers and the sheet is stretched (drawn) in the transverse direction in an oven by means of a tenter resulting in a biaxially stretched (drawn) film. The speed when drawn in transverse direction is typically in the range of 50 to 70 m/min, more preferably in the range of 55 to 65 m/min, like in the range of 57 to 62 m/min. The temperature of said stretched (drawn) sheet during the longitudinal stretching (drawing) is preferably controlled in such a way as to be within the temperature range of the melting point of the polypropylene (PP) as defined herein. Accordingly, it is preferred that the drawing temperature ($T_{draw}$) of the polypropylene (PP) when stretched (drawn) in machine direction is in the range of the inequation (I), more preferably in the range of the inequation (Ia), yet more preferably in the range of the inequation (Ib), $$Tm-50 \leq Tdraw \leq Tm-15 \qquad (I),$$

$$Tm-40 \leq Tdraw \leq Tm-15 \qquad (Ia),$$

$$Tm-35 \leq Tdraw \leq Tm-20 \qquad (Ib),$$

wherein
Tdraw is the drawing temperature ($T_{draw}$) in ° C., wherein the drawing temperature ($T_{draw}$) is defined as the temperature (in ° C.) of the first roll (R1) of two successive rolls (R1, R2) of all rolls in the oven consecutively arranged in machine direction where the polypropylene (PP) is drawn in machine direction, wherein further said two successive rolls (R1, R2) when locking in machine direction have as the first pair of successive rolls for the first time a roll speed difference of at least 20 m/min, preferably in the range of 20 to 60 m/min, more preferably in the range of 35 to 55 m/min, still more preferably in the range of 40 to 50 m/min; and Tm is the melting temperature ($T_m$) of the polypropylene (PP) in °C.

Additionally or alternatively to the inequations of the previous paragraph the drawing temperature ($T_{draw'}$) of the polypropylene (PP) when stretched (drawn) in transverse direction is in the range of the inequation (II), more preferably in the range of the inequation (IIa), yet more preferably in the range of the inequation (IIb), $$Tm-25 \leq Tdraw' \leq Tm+10 \quad \text{(II)},$$

$$Tm-20 \leq Tdraw' \leq Tm+8 \quad \text{(IIa)},$$

$$Tm-15 \leq Tdraw' \leq Tm+5 \quad \text{(IIb)},$$

wherein

Tdraw' is the drawing temperature ($T_{draw'}$) in °C. of the first segment of the drawing zone (DZT) in the oven where the polypropylene (PP) is drawn in transverse direction, wherein further this first segment of the drawing zone (DZT) is defined as the zone where the draw ratio of the drawn polypropylene (PP) is at least 1.1, preferably is in the range of 1.1 to 5.0, more preferably is in the range 1.1 to 4.0, yet more preferably is in the range of 1.1 to 3.5; and Tm is the melting temperature ($T_m$) of the polypropylene (PP) in °C.

Preferably the polypropylene (PP) runs through the first segment of the drawing zone (DZT) in the oven where the polypropylene (PP) is drawn in transverse direction in not more than 3.0 sec, more preferably in 0.5 to 2.5 sec, still more preferably in 0.7 to 2.0 sec.

Additionally it is preferred that the polypropylene (PP) runs through whole drawing zone (DZT) in the oven where the polypropylene (PP) is drawn in transverse direction in not more than 5.0 sec, more preferably in 2.5 to 5.0 sec, still more preferably in 2.8 to 4.0 sec, preferably with the proviso that the residence time of the polypropylene (PP) in the whole drawing zone (DZT) is longer than in part of the drawing zone (DZT), i.e. in the first segment of the drawing zone (DZT).

Additionally it is preferred that the drawing temperature ($T_{draw''}$) of the polypropylene (PP) when stretched (drawn) in transverse direction is in the range of the inequation (III), more preferably in the range of the inequation (IIIa), yet more preferably in the range of the inequation (IIIb), $$Tm \leq Tdraw'' \leq Tm+18 \quad \text{(III)},$$

$$Tm+1 \leq Tdraw'' \leq Tm+15 \quad \text{(IIIa)},$$

$$Tm+2 \leq Tdraw'' \leq Tm+12 \quad \text{(IIIb)},$$

wherein

Tdraw" is the drawing temperature ($T_{draw''}$) in °C. of the heating zone (HZT) in the oven where the polypropylene (PP) is drawn in transverse direction, wherein further the heating zone (HZT) is the zone upstream to the drawing zone (DZT); and Tm is the melting temperature ($T_m$) of the polypropylene (PP) in °C.

Preferably, the biaxially oriented polypropylene (BOPP) film has a draw ratio in machine direction of ≥3.0, preferably ≥4.0, and/or a draw ratio in transverse direction of ≥6.0, preferably ≥7.0. Such ratios are appreciated as commercial biaxially oriented polypropylene films must be stretchable at least to the above defined extent without breaking. The length of the sample increases during stretching in longitudinal direction and the draw ratio in longitudinal direction calculates from the ratio of current length over original sample length. Subsequently, the sample is stretched in transverse direction where the width of the sample is increasing. Hence, the draw ratio calculates from the current width of the sample over the original width of the sample. Preferably, the draw ratio in machine direction of the biaxially oriented polypropylene (BOPP) film ranges from 3.0 to 7.0 or 4.0 to 6.0 in machine direction (MD). The draw ratio in transverse direction of the biaxially oriented polypropylene (BOPP) film ranges preferably from 6.0 to 12.0 or 7.0 to 11.0.

Thus, it is a requirement of the present process that the stretching in machine direction (MD) and transverse direction (TD) is carried out in consecutive steps. Preferably, the stretching in machine direction (MD) is followed by the stretching in transverse direction (TD).

The thickness of the biaxially oriented polypropylene (BOPP) film can be up to 50.0 μm, however, typically the biaxially oriented polypropylene (BOPP) film has a thickness of not more than 40.0 μm, preferably not more than 30.0 μm, more preferably not more than 25.0 μm, yet more preferably in the range of 1 to 50.0 μm, like in the range of 2.5 to 25.0 μm.

In view of the very good results obtained for the biaxially oriented polypropylene (BOPP) film, a further aspect of the present invention refers to the use of a polypropylene (PP) as defined herein for the preparation of a biaxially oriented polypropylene (BOPP) film, preferably to the use of the polypropylene as defined herein for the preparation of a biaxially oriented polypropylene (BOPP) film under the conditions provided above.

It is appreciated that the biaxially oriented polypropylene (BOPP) film has a modulus of elasticity in transverse direction (TD) of at least 5 000 N/mm². For example, the biaxially oriented polypropylene (BOPP) film has a modulus of elasticity in transverse direction (TD) of from 5 000 to 6 500 N/mm², like from 5 000 to 6 000 N/mm².

Additionally, the biaxially oriented polypropylene (BOPP) film features a high toughness. Thus, it is a further requirement of the present invention that the biaxially oriented polypropylene (BOPP) film has an elongation at break in machine direction (MD) of at least 170%. For example, the biaxially oriented polypropylene (BOPP) film has an elongation at break in machine direction (MD) of from 170 to 220%, like from 180 to 200% or the biaxially oriented polypropylene (BOPP) film has an elongation at break in machine direction (MD) of from 180 to 220%, like from 200 to 220%.

In one embodiment of the present invention, the biaxially oriented polypropylene (BOPP) film also has a high modulus of elasticity in machine direction (MD). For example, the biaxially oriented polypropylene (BOPP) film has a modulus of elasticity in machine direction (MD) of at least 2 000 N/mm². Preferably, the biaxially oriented polypropylene (BOPP) film has a modulus of elasticity in machine direction (MD) of from 2 000 to 2 700 N/mm², like from 2 000 to 2 500 N/mm².

Additionally or alternatively, the biaxially oriented polypropylene (BOPP) film also has a high elongation at break in transverse direction (TD). For example, the biaxially oriented polypropylene (BOPP) film has an elongation at break in transverse direction (TD) of at least 46%. Preferably, the biaxially oriented polypropylene (BOPP) film has an elongation at break in transverse direction (TD) of from 46 to 60%, like from 47 to 56%, or from 46 to 70%, like from 50 to 65%.

In one embodiment of the present invention, the biaxially oriented polypropylene (BOPP) film has a) a modulus of elasticity in transverse direction (TD) of at least 5 000 N/mm² and a modulus of elasticity in machine direction (MD) of at least 2 000 N/mm², and
b) an elongation at break in machine direction (MD) of at least 170% and an elongation at break in transverse direction (TD) of at least 46%.

It is especially preferred that the values provided in the present invention for the modulus of elasticity in transverse direction (TD) and in machine direction (MD), the elongation at break in machine direction (MD) and in transverse direction (TD), as well as the tensile strength in transverse direction (TD) and in machine direction (MD) are obtained if the polypropylene (PP) when drawn in transverse direction has a drawing temperature ($T_{draw'}$) in the range of the inequation (II), more preferably the inequation (IIa), yet more preferably the inequation (IIb).

Still more preferably the values provided in the present invention for the modulus of elasticity in transverse direction (TD) and in machine direction (MD), the elongation at break in machine direction (MD) and in transverse direction (TD), as well as the tensile strength in transverse direction (TD) and in machine direction (MD) are obtained if the polypropylene (PP) has
(a) a drawing temperature ($T_{draw}$) when stretched (drawn) in machine direction in the range of the inequation (I), more preferably in the range of the inequation (Ia), yet more preferably in the range of the inequation (Ib), and
(b) a drawing temperature ($T_{draw'}$) when stretched (drawn) in transverse direction in the range of the inequation (II), more preferably in the range of the inequation (IIa), yet more preferably in the range of the inequation (IIb), and optionally
(c) the polypropylene (PP) has a drawing temperature ($T_{draw''}$) when stretched (drawn) in transverse direction in the range of the inequation (III), more preferably in the range of the inequation (IIIa), yet more preferably in the range of the inequation (IIIb).

Further preferred process conditions to achieve the desired properties for the biaxially oriented polypropylene (BOPP) (i.e. for the modulus of elasticity in transverse direction (TD) and in machine direction (MD), for the elongation at break in machine direction (MD) and in transverse direction (TD), as well as for the tensile strength in transverse direction (TD) and in machine direction (MD)) are the speeds as described above.

Subsequently, the biaxially oriented polypropylene (BOPP) film can be treated by corona discharge in air, nitrogen, carbon dioxide gas or any of the mixtures on the surface to be metalized, to improve the adhesive strength to the metal to be deposited, and wound by a winder.

In a further aspect, the present invention is directed to an article comprising the instant biaxially oriented polypropylene (BOPP) film. For example, the article can be a packaging materials like transparent cups, containers, trays or thin wall packaging or dielectrical films for capacitor or metallisable films.

The instant polypropylene (PP), like the propylene homopolymer (H-PP) or preferably the random propylene copolymer (C-PP), may be produced in a sequential polymerization process.

The term "sequential polymerization process" indicates that the polypropylene is produced in at least two, like two or three, reactors connected in series. Accordingly the present process comprises at least a first polymerization reactor (R1), a second polymerization reactor (R2), and optionally a third polymerization reactor (R3). The term "polymerization reactor" shall indicate that the main polymerization takes place. Thus in case the process consists of two or three polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According, to the present invention the slurry reactor (SR) is preferably a (bulk) loop reactor (LR). Accordingly, the average concentration of polypropylene (PP), i.e. the first fraction ($1^{st}$ F) of the polypropylene (PP), in the polymer slurry within the loop reactor (LR) is typically from 15 wt.-% to 55 wt.-%, based on the total weight of the polymer slurry within the loop reactor (LR). In one embodiment of the present invention, the average concentration of polypropylene (PP) i.e. of the first fraction ($1^{st}$ F) of the polypropylene (PP) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably, the polypropylene (PP), i.e. the first fraction ($1^{st}$ F) of the polypropylene (PP), of the first reactor (R1), more preferably polymer slurry of the loop reactor (LR) containing the first fraction ($1^{st}$ F) of the polypropylene (PP), is directly fed into the second reactor (R2), i.e. into the first gas phase reactor (GPR-1), without a flash step between the stages. This kind of direct feed is described in EP 887379 A, EP 887380 A, EP 887381 A and EP 991684 A. By "direct feed" is meant a process wherein the content of the first reactor (R1), i.e. of the loop reactor (LR), the polymer slurry comprising the first fraction ($1^{st}$ F) of the polypropylene (PP), is led directly to the next stage gas phase reactor.

Alternatively, the polypropylene (PP), i.e. the first fraction ($1^{st}$ F) of the polypropylene (PP), of the first reactor (R1), more preferably polymer slurry of the loop reactor (LR) containing the first fraction ($1^{st}$ F) of the polypropylene (PP), may be also directed into a flash step or through a further concentration step before fed into the second reactor (R2), i.e. into the first gas phase reactor (GPR-1). Accordingly, this "indirect feed" refers to a process wherein the content of the first reactor (R1), of the loop reactor (LR), i.e. the polymer slurry, is fed into the second reactor (R2), into the first gas phase reactor (GPR-1), via a reaction medium separation unit and the reaction medium as a gas from the separation unit.

A gas phase reactor (GPR) according to this invention is preferably a fluidized bed reactor, a fast fluidized bed reactor or a settled bed reactor or any combination thereof More specifically, the second reactor (R2), optionally the third reactor (R3) and any subsequent reactor are preferably gas phase reactors (GPRs). Such gas phase reactors (GPR) can be any mechanically mixed or fluid bed reactors. Preferably, the gas phase reactors (GPRs) comprise a mechanically agitated fluid bed reactor with gas velocities of at least 0.2 msec. Thus, it is appreciated that the gas phase reactor is a fluidized bed type reactor preferably with a mechanical stirrer.

Thus, in a preferred embodiment the first reactor (R1) is a slurry reactor (SR), like loop reactor (LR), whereas the second reactor (R2) and any optional subsequent reactor, like the third reactor (R3), are gas phase reactors (GPR). Accordingly for the instant process at least two, preferably two or three, polymerization reactors, namely a slurry reactor (SR), like loop reactor (LR), a first gas phase reactor (GPR-1), and optionally a second gas phase reactor (GPR-2) connected in series are used. If needed prior to the slurry reactor (SR) a pre-polymerization reactor is placed.

A Ziegler-Natta catalyst (ZN-C), as defined below, is fed into the first reactor (R1) and is transferred with the polymer (slurry) obtained in the first reactor (R1) into the subsequent reactors. If the process covers also a pre-polymerization step it is preferred that the Ziegler-Natta catalyst (ZN-C) is fed in the pre-polymerization reactor. Subsequently the pre-polymerization product containing the Ziegler-Natta catalyst (ZN-C) is transferred into the first reactor (R1).

A preferred multistage process is a "loop-gas phase"-process, such as developed by *Borealis* A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen. Accordingly it is preferred that the temperature in at least one of the two or three reactors, preferably at least in the first reactor (R1), i.e. in the loop reactor (LR), is in the range of 70 to 100° C., preferably in the range of 70 to 90° C., more preferably in the range of 75 to 90° C. In one preferred embodiment in all (two or three) reactors the temperature is in the range of 70 to 100° C., preferably in the range of 70 to 90° C., more preferably in the range of 75 to 90° C. In one specific embodiment the temperature in all (two or three) reactors is essentially the same, i.e. differ not more than 5° C. from each other and further the temperature in all three reactors is in the range of 70 to 100° C., preferably in the range of 70 to 90° C., more preferably in the range of 75 to 90° C.

Typically, the pressure in the first reactor (R1), preferably in the loop reactor (LR), is in the range of from 20 to 80 bar, preferably 30 to 60 bar, whereas the pressure in the second reactor (R2), i.e. in the first gas phase reactor (GPR-1), and in the optional third reactor (R3), i.e. in the optional second gas phase reactor (GPR-2), and in any subsequent reactor is in the range of from 5 to 50 bar, preferably 15 to 35 bar.

Hydrogen is added in each reactor in order to control the molecular weight, i.e. the melt flow rate $MFR_2$.

Preferably the weight-ratio of co-catalyst (Co) to propylene (C3) [Co/C3], especially when considering the propylene feed into the pre polymerization and loop reactors is in the range of 25 g/t to 40 g/t, more preferably in the range of 28 g/t to 38 g/t, yet more preferably in the range of 29 g/t to 35 g/t.

Preferably the weight-ratio of external donor (ED) to propylene (C3) [ED/C3], especially when considering the total propylene feed into the pre polymerization and loop reactors is in the range of 2.8 g/t to 4.8 g/t, more preferably in the range of 3.0 g/t to 4.6 g/t, yet more preferably in the range of 3.3 g/t to 4.3 g/t.

The residence time can vary in the reactors identified above. In one embodiment, the residence time in the first reactor (R1), for example in the loop reactor (LR), is in the range of from 0.5 to 5 hours, for example 0.5 to 3 hours, while the residence time in the subsequent reactors i.e. in the gas phase reactors, generally will be from 0.5 to 5 hours.

Accordingly, the process for the preparation of the polypropylene (PP) comprises the following steps under the conditions set out above (a) in the first polymerization reactor (R1), i.e. in a loop reactor (LR), propylene and optionally at least one other α-olefin, like optionally a $C_2$ to $C_{10}$ α-olefin other than propylene, is/are polymerized obtaining a first fraction ($1^{st}$ F) of the polypropylene (PP), (b) transferring said first fraction ($1^{st}$ F) to second polymerization reactor (R 2), (c) in the second polymerization reactor (R2) propylene and optionally at least one other α-olefin, like optionally a $C_2$ to $C_{10}$ α-olefin other than propylene, is/are polymerized in the presence of the first fraction ($1^{st}$ F) obtaining a second fraction ($2^{nd}$ F) of the polypropylene (PP), said first fraction ($1^{st}$ F) and said second fraction ($2^{nd}$ F) form the polypropylene (PP) or a first mixture ($1^{st}$ M), in case of the first mixture ($1^{st}$ M)

(d) transferring said first mixture ($1^{st}$ M) to third polymerization reactor (R3), and (e) in the third polymerization reactor (R3) propylene and optionally at least one other α-olefin, like optionally a $C_2$ to $C_{10}$ α-olefin other than propylene, is/are polymerized in the presence of the first mixture ($1^{st}$ M) obtaining a third fraction ($3^{rd}$ F) of the polypropylene (PP), said first mixture ($1^{st}$ M) and said third fraction ($3^{rd}$ F) form the polypropylene (PP).

It is to be noted that in case the polypropylene (PP) is a propylene homopolymer (H-PP) also its fractions are propylene homopolymer fractions. In such a case the individual fractions may differ in the melt flow rate $MFR_2$, but not necessarily. Accordingly, in one embodiment the polypropylene (PP) is a propylene homopolymer (H-PP), wherein each fraction has a similar melt flow rate $MFR_2$, i.e. differ not more than +/−0.7 g/10 min, more preferably differ not more than +/−0.5 g/10 min, from each other.

In case the polypropylene (PP) is a random propylene copolymer (C-PP) at least one of the three fractions is a random propylene copolymer fraction. Accordingly, a random propylene copolymer (C-PP) may also comprise a propylene homopolymer fraction. However, it is preferred that the random propylene copolymer (C-PP) consists of random propylene copolymer fractions only.

After step (c) (in the event the polypropylene (PP)) is produced in two reactors) or after step (e) the polypropylene (PP) is discharged with or without any washing step.

As pointed out above in the specific process for the preparation of the polypropylene (PP) as defined above a Ziegler-Natta catalyst (ZN-C) is used. This means, the polypropylene (PP) is preferably produced in the presence of a Ziegler-Natta catalyst (ZN-C) as defined below. Still more preferred the polypropylene (PP) is produced in a process as defined above and in the presence of a Ziegler-Natta catalyst (ZN-C) as defined in the instant invention. Accordingly, the Ziegler-Natta catalyst (ZN-C) will be now described in more detail.

Accordingly, the Ziegler-Natta catalyst (ZN-C) must comprise (a) a pro-catalyst (PC) comprising
  (a1) a compound of a transition metal (TM),
  (a2) a compound of a metal (M) which metal is selected from one of the groups 1 to 3 of the periodic table (IUPAC), and
  (a3) an internal electron donor (ID),
(b) a co-catalyst (Co), and
(c) an external donor (ED).

The metal of the compound of a transition metal (TM) is preferably selected from one of the groups 4 to 6, in particular of group 4, like titanium (Ti), of the periodic table (IUPAC). Accordingly, the compound of the transition metal (TM) is preferably selected from the group consisting of titanium compound having an oxidation degree of 3 or 4, vanadium compound, chromium compound, zirconium compound, hafnium compound and rare earth metal compounds, more preferably selected from the group consisting of titanium compound, zirconium compound and hafnium compound, and most preferably the transition metal is a titanium compound. Moreover the compounds of the transition metal (TM) are in particular transition metal halides, such as transition metal chlorides. The titanium trichloride and titanium tetrachloride are particularly preferred. Especially preferred is titanium tetrachloride.

According to this invention the term "compound of transition metal" and the term "transition metal compound" are synonyms.

The compound of metal (M) is a compound which metal is selected from one of the groups 1 to 3 of the periodic table (IUPAC), preferably from the Group 2 metal. Usually the compound of metal (M) is titaniumless. Especially the compound of metal (M) is a magnesium compound, like MgCl$_2$.

Moreover as stated above the pro-catalyst (PC) must comprise an internal electron donor (ID), which is chemically different to the external donor (ED) of the Ziegler-Natta catalyst (ZN-C), i.e. the internal donor (ID) preferably comprises, still more preferably is, a dialkylphthalate of formula (II)

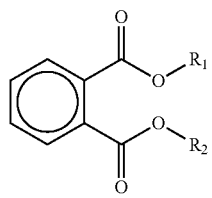

(II)

wherein R$_1$ and R$_2$ can be independently selected from a C$_1$ to C$_4$ alkyl, preferably R$_1$ and R$_2$ are the same, i.e. define the same C$_1$ to C$_4$ alkyl residue.

Preferably, the internal donor (ID) comprises, like is, a n-dialkylphthalate of formula (II), wherein R$_1$ and R$_2$ can be independently selected from a C$_1$ to C$_4$ n-alkyl, preferably R$_1$ and R$_2$ are the same, i.e. define the same C$_1$ to C$_4$ n-alkyl residue. Still more preferably the internal donor (ID) comprises, like is, n-dialkylphthalate of formula (II), wherein R$_1$ and R$_2$ can be independently selected from a C$_1$ and C$_2$ alkyl, preferably R$_1$ and R$_2$ are the same, i.e. define the same C$_1$ alkyl residue. Still more preferably the internal donor (ID) comprises, like is, diethylphthalate.

Of course the above defined and further below defined pro-catalyst (PC) is a solid, supported pro-catalyst composition.

Moreover, it is preferred that the pro-catalyst (PC) contains not more than 2.5 wt.-% of the transition metal (TM), preferably titanium. Still more preferably the pro-catalyst contains 1.7 to 2.5 wt.-% of the transition metal (TM), preferably titanium. Additionally it is appreciated that the molar ratio of internal donor (ID) to metal (M), like Mg, of the pro-catalyst [ID/M] is between 0.03 and 0.08, still more preferably between 0.04 and 0.06, and/or its internal donor (ID) content is between 4 and 15 wt.-%, still more preferably between 6 and 12 wt.-%.

Furthermore, it is preferred that the internal donor (ID) is the result of a transesterification of a dialkylphthalate of formula (I) with an alcohol. It is in particular preferred that the pro-catalyst (PC) is a pro-catalyst (PC) as produced in the patent applications WO 87/07620, WO 92/19653, WO 92/19658 and EP 0 491 566. The content of these documents is herein included by reference.

The metal of the compound of a transition metal (TM) is preferably selected from one of the groups 4 to 6, in particular of group 4, like titanium (Ti), of the periodic table (IUPAC). Accordingly it is preferred that the pro-catalyst (PC) is prepared by bringing together
(a) a compound of a transition metal (TM), preferably a transition metal (TM) compound selected from one of the groups 4 to 6, more preferably a transition metal (TM) compound of group 4, like titanium (Ti) compound, of the periodic table (IUPAC), in particular a titanium halide, like TiCl$_3$ or TiCl$_4$, the latter especially preferred,
(b) a compound of a metal (M) which metal is selected from one of the groups 1 to 3 of the periodic table (IUPAC), preferably a compound of magnesium, like MgCl$_2$,
(c) a C$_1$ to C$_4$ alcohol, preferably a C$_1$ to C$_2$ alcohol, like methanol or ethanol, most preferably ethanol and
(d) a dialkylphthalate of formula (I),

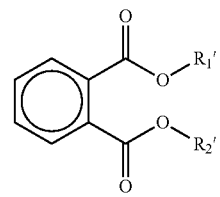

(I)

wherein R$_1$' and R$_2$' have more carbon atoms as said alcohol, preferably are independently at least a C$_5$ alkyl, like at least a C$_8$ alkyl, more preferably R$_1$' and R$_2$' are the same and are at least a C$_5$ alkyl, like at least a C$_8$ alkyl, or preferably a n-dialkylphthalate of formula (I) wherein R$_1$' and R$_2$' have more carbon atoms as said alcohol, preferably are independently at least a C$_5$ n-alkyl, like at least a C$_8$ n-alkyl, more preferably R$_1$' and R$_2$' are the same and are at least a C$_5$ n-alkyl, like at least a C$_8$ n-alkyl or more preferably dioctylphthalate, like di-iso-octylphthalate or diethylhexylphthalate, yet more preferably diethylhexylphthalate, wherein a transeterification between said alcohol and said dialkylphthalate of formula (I) has been carried out under suitable transesterification conditions, i.e. at a temperature between 130 to 150° C.

Among others the preferred dialkylphthalate of formula (I) for the above and further down described process for the manufacture of the pro-catalyst (PC) is selected from the group consisting of propylhexyphthalate (PrHP), dioctylphthalate (DOP), di-iso-decylphthalate (DIDP), diundecylphthalate, diethylhexylphthalate and ditridecylphthalate (DTDP). The most preferred dialkylphthalate is dioctylphthalate (DOP), like di-iso-octylphthalate or diethylhexylphthalate, in particular diethylhexylphthalate.

Preferably at least 80 wt.-%, more preferably at least 90 wt.-%, of the dialkylphthalate of formula (I) is transesterified to the dialkylphthalate of formula (II) as defined above.

It is particular preferred that the pro-catalyst (PC) is prepared by
(a) contacting a spray crystallized or solidified adduct of the formula MgCl$_2$*nEtOH, wherein n is 1 to 6, with TiCl$_4$ to form a titanised carrier,
(b) adding to said titanised carrier
  (i) a dialkylphthalate of formula (I) with R$_1$' and R$_2$' being independently at least a C$_5$ alkyl, like at least a C$_8$ alkyl, or preferably
  (ii) a dialkylphthalate of formula (I) with R$_1$' and R$_2$' being the same and being at least a C$_5$ alkyl, like at least a C$_8$ alkyl or more preferably
  (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is dioctylphthalate (DOP), like di-iso-octylphthalate or diethylhexylphthalate, in particular diethylhexylphthalate, to form a first product
(c) subjecting said first product to suitable transesterification conditions, i.e. at a temperature between 130 to 150° C. such that said ethanol is transesterified with said ester groups of said dialkylphthalate of formula (I) to form preferably at least 80 mol-%, more preferably 90 mol-%, most preferably 95 mol-%, of a dialkylphthalate of formula (II) with R$_1$ and R$_2$ being —CH$_2$CH$_3$, and
(d) recovering said transesterification product as the pro-catalyst (PC).

As a further requirement the Ziegler-Natta catalyst (ZN-C) must comprise a co-catalyst (Co). Preferably the co-catalyst (Co) is a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkylaluminium, like triethylaluminium (TEA), dialkyl aluminium chloride or alkyl aluminium sesquichloride. In one specific embodiment the co-catalyst (Co) is triethylaluminium (TEA).

Additionally, the Ziegler-Natta catalyst (ZN-C) must comprise an external donor (ED). Preferably the external donor (ED) is a hydrocarbyloxy silane derivative. Accordingly in one specific embodiment the external donor (ED) is represented by formula (IIIa) or (IIIb).

Formula (IIIa) is defined by

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^x$ and R$^y$ are the same, yet more preferably both R$^x$ and R$^y$ are an ethyl group.

More preferably the external donor (ED) is selected from the group consisting of diethylaminotriethoxysilane [Si(OCH$_2$CH$_3$)$_3$(N(CH$_2$CH$_3$)$_2$)] (U-donor), dicyclopentyl dimethoxy silane [Si(OCH$_3$)$_2$(cyclo-pentyl)$_2$] (D-donor), diisopropyl dimethoxy silane [Si(OCH$_3$)$_2$(CH(CH$_3$)$_2$)$_2$] (P-donor) and mixtures thereof. Most preferably the external donor is dicyclopentyl dimethoxy silane [Si(OCH$_3$)$_2$(cyclo-pentyl)$_2$] (D-donor).

Accordingly, especially good results are achieved with a Ziegler-Natta catalyst (ZN-C) comprising
(a) a pro-catalyst (PC) comprising titanium, MgCl$_2$, and internal donor (ID), wherein said internal donor (ID) comprises, preferably is,
  (i) a dialkylphthalate of formula (II),

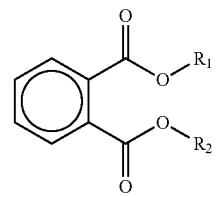

wherein R$_1$ and R$_2$ are independently selected from a C$_1$ to C$_4$ alkyl,
  preferably R$_1$ and R$_2$ are the same, i.e. define the same C$_1$ to C$_4$ alkyl residue,
  or preferably
  (ii) a n-dialkylphthalate of formula (II), wherein R$_1$ and R$_2$ can be independently selected from a C$_1$ to C$_4$ n-alkyl, preferably R$_1$ and R$_2$ are the same, i.e. define the same C$_1$ to C$_4$ n-alkyl residue,
  or more preferably
  (iii) a n-dialkylphthalate of formula (II), wherein R$_1$ and R$_2$ can be independently selected from a C$_1$ and C$_2$ alkyl, preferably R$_1$ and R$_2$ are the same, i.e. have the same C$_1$ or C$_2$ alkyl residue,
  or still more preferably
  (iv) diethylphthalate,
(b) a cocatalyst (Co) being trialkylaluminium, dialkyl aluminium chloride or alkyl aluminium sesquichloride, preferably triethylaluminium (TEA), and
(c) an external donor (ED) being selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$] (D-donor), diisopropyl dimethoxy silane [Si(OCH$_3$)$_2$(CH(CH$_3$)$_2$)$_2$] (P-donor) and mixtures thereof, more preferably being dicyclopentyl dimethoxy silane [Si(OCH$_3$)$_2$(cyclo-pentyl)$_2$].

More preferably said pro-catalyst (PC) has been produced as defined above and also described in the patent applications WO 92/19658, WO 92/19653 and EP 0 491 566 A2. The co-catalyst (Co) as well as the external donor (ED) are added to the pro-catalyst (PC) prior to polymerization of the polypropylene (PP) or are fed all together to the first reactor (R1) or—if used—to the pre-polymerization reactor.

Important aspect of the present invention is that the ratio between on the one hand of co-catalyst (Co) and the external donor (ED) [Co/ED] and on the other hand of the co-catalyst (Co) and the transition metal (TM) [Co/TM] have been carefully chosen.

Accordingly, (a) the mol-ratio of co-catalyst (Co) to external donor (ED) [Co/ED] must be in the range of above 10 to below 40, and
(b) the mol-ratio of co-catalyst (Co) to transition metal (TM) [Co/TM] must be in the range of above 40 to below 160.

In the following the present invention is further illustrated by means of examples.

EXAMPLES

A. Measuring Methods

The following definitions of terms and determination methods apply for the above general description of the invention including the claims as well as to the below examples unless otherwise defined.

Quantification of Ethylene Content by NMR Spectroscopy

Quantitative nuclear-magnetic resonance (NMR) spectroscopy was used to quantify the comonomer content of the polymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225 and Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^{1}H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer:

$$fE=(E/(P+E))$$

The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents.

For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$C2\ [mol\ \%]=100*fE$$

The weight percent comonomer incorporation was calculated from the mole fraction:

$$C2\ [wt\ \%]=100*(fE*28.06)/((fE*28.06)+((1-fE)*42.08))$$

Quantification of Microstructure by NMR Spectroscopy

Quantitative nuclear-magnetic resonance (NMR) spectroscopy was used to quantify the isotacticity, tacticity distribution and content of regio-defects of the polymers.

Quantitative $^{13}C\{^{1}H\}$ NMR spectra recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm selective excitation probehead at 125° C. using nitrogen gas for all pneumatics. Approximately 200 mg of material was dissolved in 1,2-tetrachloroethane-$d_2$ (TCE-$d_2$). This setup was chosen primarily for the high resolution needed for tacticity distribution quantification (Busico, V., Cipullo, R., Prog. Polym. Sci. 26 (2001) 443, Busico, V., Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225 and Busico, V., Cipullo, R., Monaco, G., Vacatello, M., Segre, A. L., Macromolecules 30 (1997) 6251). A total of 8192 (8 k) transients were acquired per spectra.

Quantitative $^{13}C\{^{1}H\}$ NMR spectra were processed, integrated and relevant quantitative properties determined from the integrals using proprietary computer programs. All chemical shifts are internally referenced to the methyl signal of the isotactic pentad mmmm at 21.85 ppm.

The tacticity distribution was quantified through integration of the methyl region between 23.6 and 19.7 ppm correcting for any sites not related to the stereo sequences of interest. (Busico, V., Cipullo, R., Prog. Polym. Sci. 26 (2001) 443, and Busico, V., Cipullo, R., Monaco, G., Vacatello, M., Segre, A. L., Macromolecules 30 (1997) 6251). Characteristic signals corresponding isolated ethylene incorporation were observed (Wang, W-J., Zhu, S., Macromolecules 33 (2000), 1157 and Cheng, H. N., Macromolecules 17 (1984), 1950). Characteristic signals corresponding to the presence of regio defects (Resconi, L., Cavallo, L., Fait, A., Piemontesi, F., Chem. Rev. 2000, 100, 1253) were not observed. With characteristic signals corresponding to regio defects (Resconi, L., Cavallo, L., Fait, A., Piemontesi, F., Chem. Rev. 2000, 100, 1253) or ethylene incorporation (Wang, W.-J., Zhu, S., Macromolecules 33 (2000), 1157 and Cheng, H. N., Macromolecules 17 (1984), 1950) observed the influence of regio-defects on the quantification of the tacticity distribution was corrected for by subtraction of representative integrals from integrals corresponding to specific steric n-ad sequences.

The presence of copolymerised ethylene in the form of isolated ethylene incorporation was indicated by the presence of the $S\alpha\gamma$, $T\beta\delta$ and $S\beta\beta$ sites at 37.9, 30.9 and 24.5 ppm respectively and confirmed by the presence of other characteristic sites.

The amount of isolated ethylene incorporation was quantified using the average integral (E) of the two characteristic methylene signals named $S\alpha\gamma$ and $S\beta\beta$ accounting the number of sites per unit and corrected using an empirically determined correction factor (f):

$$E'=f*0.5*(0.5*S\alpha\gamma+S\beta\beta)$$

The empirical correction factor was need as these signals are not directly quantitative with respect to the methyl signals under the given experimental conditions due to their different NOE and spin-lattice relaxation times.

Characteristic signals corresponding to other forms of ethylene incorporation were not observed (Wang, W.-J., Zhu, S., Macromolecules 33 (2000), 1157 and Cheng, H. N., Macromolecules 17 (1984), 1950).

The pentad tacticity distribution was determined through direct separate integration of each methyl signal from a given steric pentad followed by normalisation to the sum of methyl signals from all steric pentads. The relative content of a specific steric pentad was reported as the mole fraction or percentage of a given steric pentad xxxx with respect to all steric pentads:

$$[xxxx]=xxxx/(mmmm+mmmr+rmmr+mmrr+xmrx+mrmr+rrrr+mrrr+mrrm)$$

where xmrx represents the combined integral of both mmrm and rmrr as signal from these steric pentads are not commonly resolved. The pentad isotacticity was thus given by:

$$[mmmm]=mmmm/(mmmm+mmmr+rmmr+mmrr+xmrx+mrmr+rrrr+mrr+mrrm)$$

When appropriate integrals were corrected for the presence of sites not directly associated with steric pentads.

Specifically the following corrections were applied to the raw integrals (xxxx') to account for the presence of sites not directly associated with steric pentads:

$$xmrx=xmrx'-E'$$

The amount of primary inserted propene (p) was quantified based on the integral of all signals in the methyl region (CH3) from 23.6 to 19.7 ppm with correction for other species included in the integral not related to primary insertion and for primary insertion signals excluded from this region such that:

$$p=CH3$$

The average length of stereo sequences consisting of four or more monomer unites with like tacticity accounting for the presence of comonomer, i.e. the comonomer corrected meso sequence length determined from the pentad tacticity distribution (MSL4'), was calculated using the mole fractions of the mmmm and mmmr steric pentads and mole fraction of the ethylene content (fE) as determined by the $^{13}$C NMR spectroscopy method for ethylene comonomer content determination:

$$MSL4'=(((1-(fE*5))*[mmmm])/\\(((1-(fE*5))*0.5*[mmmr])+(0.5*2*fE)))+4$$

It should be noted that the equation for MSL4' is identical to that for MSL4 when the comonomer content is zero. That is if fE=0 then MSL4'=MSL4=4+2 [mmmm]/[mmmr].

Rheology: Dynamic rheological measurements were carried out with Rheometrics RDA-II QC on compression moulded samples under nitrogen atmosphere at 200° C. using 25 mm—diameter plate and plate geometry. The oscillatory shear experiments were done within the linear viscoelastic range of strain at frequencies from 0.01 to 500 rad/s. (ISO 6721-10)

The values of storage modulus (G'), loss modulus (G"), complex modulus (G*) and complex viscosity ($\eta$*) were obtained as a function of frequency ($\omega$).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

From the following equations $$\eta'=G''/\omega \text{ and } \eta''=G'/\omega$$

$$f'(\omega)=G''(\omega)*\omega/[G'(\omega)^2+G''(\omega)^2]$$

$$f''(\omega)=G'(\omega)*\omega/[G'(\omega)^2+G''(\omega)^2]$$

The polydispersity index, PI, $PI=10^5/G_c$, is calculated from the cross-over point of $G'(\omega)$ and $G''(\omega)$, for which $G'(\omega_c)=G''(\omega_c)=G_c$ holds.

Melt Flow Rate (MFR$_2$)

The melt flow rates were measured with a load of 2.16 kg (MFR$_2$) at 230° C. The melt flow rate is that quantity of polymer in grams which the test apparatus standardized to ISO 1133 extrudes within 10 minutes at a temperature of 230° C. under a load of 2.16 kg.

The Xylene Solubles (XCS, Wt.-%): Content of xylene cold solubles (XCS) is determined at 25° C. according ISO 16152; first edition; 2005-07-01.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Tensile strength in machine and transverse direction were determined according to ISO 527-3 at 23° C. on the biaxially oriented films. Testing was performed at a cross head speed of 1 mm/min.

Elongation at break in machine and transverse direction were determined according to ISO 527-3 at 23° C. on the biaxially oriented films. Testing was performed at a cross head speed of 1 mm/min.

Modulus of Elasticity in machine and transverse direction were determined according to ISO 527-3 at 23° C. on the biaxially oriented films. Testing was performed at a cross head speed of 1 mm/min.

Number Average Molecular Weight ($M_n$), Weight Average Molecular Weight ($M_w$)

Molecular weight averages Mw and Mn were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

B. Examples

The catalyst used in the polymerization process for examples IE1 and IE2 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used. The aluminium to donor ratio is indicated in table 1.

As additives 0.56 wt. % of a mixture of 1.3 parts of Calicium Stearate (Ceasit FI from Bearlocher), 80.7 parts of Pentaerythrityl-tetrakis(3-(3',5'-di-tert. butyl-4-hydroxyphenyl)-propionate (Irganox 1010 from BASF AG) and 18.0 parts of 2,6-di-tert. butyl-4-methyl phenol (Ionol CP from Oxiris Chemicals) were added to the polymers.

TABLE 1

Preparation of examples IE1 and IE2

| Example | | IE1 | IE2 |
|---|---|---|---|
| Ti in cat | [wt.-%] | 1.8 | 1.8 |
| TEAL/Ti | [mol/mol] | 154 | 154 |
| TEAL/Donor | [mol/mol] | 16 | 16 |
| Prepoly | | | |
| Reactor Temp. | [° C.] | 30 | 30 |
| H2/C3 | [mol/kmol] | 0.589 | 0.589 |
| Loop | | | |
| Reactor Temp. | [° C.] | 85 | 85 |
| H2/C3 | [mol/kmol] | 1.489 | 1.489 |
| split | [wt.-%] | 39.3 | 39.3 |
| $MFR_2$ | [g/10 min] | 3.05 | 3.05 |
| GPR 1 | | | |
| Reactor Temp. | [° C.] | 85 | 85 |
| H2/C3 | [mol/kmol] | 17 | 17 |
| split | [wt.-%] | 54.2 | 54.2 |
| $MFR_2$ | [g/10 min] | 2.8 | 2.8 |
| $MFR_2$ produced in GPR1 | [g/10 min] | 2.65 | 2.65 |
| GPR 2 | | | |
| Reactor Temp. | [° C.] | 90 | 90 |
| H2/C3 | [mol/kmol] | 20 | 20 |
| C2/C3 | [mol/kmol] | | 2.5 |

TABLE 1-continued

Preparation of examples IE1 and IE2

| Example | | IE1 | IE2 |
|---|---|---|---|
| split | [wt.-%] | 6.5 | 6.5 |
| $MFR_2$ | [g/10 min] | 2.8 | 2.8 |
| $MFR_2$ produced in GPR2 | [g/10 min] | 2.8 | 2.8 |

The properties of the unstretched inventive examples IE1 and IE2 as well as of a comparative example CE1 are summarized in Table 2.

TABLE 2

Properties of unstretched polypropylene samples

| Examples | Unit | CE1 | IE1 | IE2 |
|---|---|---|---|---|
| C2 | [mol %] | 0 | 0 | 0.2 |
| $MFR_2$ | [g/10 min] | 2.2 | 3.5 | 3.5 |
| XS | [wt %] | 3.3 | 1.6 | 1.6 |
| mmmm | [%] | 92.3 | 97.2 | 97.2 |
| $T_m$ | [° C.] | 159.5 | 166.0 | 164.0 |
| $T_c$ | [° C.] | 111.3 | 124.6 | 124.6 |
| PI | [Pas$^{-1}$] | 4.3 | 3.4 | 3.4 |
| $M_w/M_n$ | [—] | 6.1 | 6.2 | 6.2 |
| MSL4' | [monomers] | 100 | 210 | 146 |

As comparative example CE1, a commercial propylene homopolymer (available as HB311BF from Borealis AG, Austria) has been used.

A biaxially oriented polypropylene (BOPP) film comprising either the inventive example IE1, the inventive example IE2 or the comparative example CE1 was prepared by using a BOPP pilot line of Brückner Maschinenbau. The used BOPP pilot line closely resembles the tenter frame technology of full scale commercial lines, comprising of (i) a casting unit to create a sheet of un-oriented film, (ii) a machine orientation section to stretch the cast film in machine direction (MD) (machine orientation operation (MDO)) and (iii) a heated oven for the transverse orientation operation (TDO), yielding the BOPP film.

In Table 3, the applied settings for the preparation of the present BOPP film are outlined.

TABLE 3

Settings for the BOPP film preparation

| | Temperature [° C.] | speed [m/min] | Length of relevant drawing section | Draw ratio | Strain rate ($\epsilon'$) |
|---|---|---|---|---|---|
| Melt | 260 | — | 15 cm$^a$ | 4 | 2 s$^{-1}$ |
| Cast | 90 | 13 | n.a. | 0 | — |
| MDO | 137$^b$ | 13 → 60 | 5 mm$^c$ | 4.6 | ~6 s$^{-1}$ |
| TDO1 | 170 to 176 | 60 | 4.1 m$^d$ | 1.0 | 0.0 |
| TDO2 | 164$^e$ | 60 | 0.8 m$^f$ | 1.1-2.7 | 1 s$^{-1}$ |
| TDO3 | 160-164 | 60 | 3.3 m$^g$ | 1.1-9.0 | 1 s$^{-1}$ |

$^a$distance between chill roll and die exit,
$^b$temperature of the first roll (R1) of the two successive rolls (R1, R2) = [$T_{draw}$],
$^c$distance between last heating roll and first drawing roll
$^d$the length of the heating zone
$^e$temperature of the first segment of the drawing zone (DZT) = $T_{draw'}$
$^f$length of the first segment of the drawing zone (DZT)
$^g$the total length of the drawing zone (DZT)
MDO drawing in machine direction [$T_{draw}$]
TDO1 drawin in transverse direction: heating zone (HZT) [$T_{draw''}$]
TDO2 drawin in transverse direction: first segment of the drawing zone (DZT) [$T_{draw'}$]
TDO3 drawin in transverse direction: total drawing zone (DZT)

Each resin was extruded through a T-die (die-gap 1 mm) and was cast onto the chill roll which was set to 90° C. The melt, before contacting the chill roll, was drawn in air by a factor 4, at a Hencky strain rate of approximately 2 s$^{-1}$, as achieved by the difference in melt output rate and take up speed (13 m/min) A final cast film thickness of ~250 µm was obtained. This cast film was continuously fed to the MDO unit.

The MDO unit of the Bruckner pilot BOPP line was composed of 12 rolls, of which the first 7 rolls are used to heat the cast film to the MD stretching temperature (137° C.). Rolls 8-12 were run at 60 m/min, providing the MDO drawing by a factor of 4.6 ($\lambda_{MDO}$). The final rolls of the MDO unit anneal the MDO film at 126° C. The very small gap width between roll 7 and 8 (5-10 mm) causes a very high strain rate of ~6 s$^{-1}$. Table 4 lists the temperature of each MDO roll.

TABLE 4

Temperatures of MDO rolls

| Roll # | 1 | 2 | 3 | 4 | 5 | 6 | 7 | 8 | 9 | 10 | 11 | 12 |
|---|---|---|---|---|---|---|---|---|---|---|---|---|
| Temperature [° C.] | 88 | 94 | 102 | 108 | 114 | 120 | 137 | 135 | 110 | 110 | 126 | 126 |

The drawing of the MDO film in TD direction and its transport in MD direction along the length of the TDO oven was accomplished by two counter rotating belts, which run on both sides of the TDO oven, both equipped with several, equidistant clamps. The clamps of each belt, before they enter the TDO oven, automatically open and then close to grab the MDO film which is continuously fed into the TDO oven consisting of a heating-, drawing-, relaxation- and annealing-zone. Each zone is further segmented into shorter sections which can be set to a selected temperature. The temperatures in the TDO oven were typically adjusted to temperatures between 140 and 175° C.

The TDO drawing was accomplished by the increase of the transversal belt-to-belt distance in the drawing zone. The belt-to-belt distance increases linearly, providing a non-constant (decreasing) TD drawing rate of the MDO film. The initial strain rate, calculated from length of the drawing section (3.3 m), line speed (60 m/min) and TD drawing ratio (×9) is ~1 s$^{-1}$. This is a typical strain rate for full scale lines. In the relaxation zone of the TDO oven, the draw ratio was slightly reduced, via a small decrease in the belt-to-belt TD-distance. The TDO film was collected on a cardboard mandrel and stored for further analyses.

The properties of the biaxially oriented polypropylene (BOPP) films prepared from the polypropylenes of the inventive examples IE1 and IE2 and comparative example CE1 are summarized in Table 5.

As can be gathered from the measured details outlined in Table 5, the inventive BOPP film has favourable film properties compared to prior art biaxially oriented polypropylene (BOPP) films. In particular, it can be gathered that the inventive BOPP films show a better balanced mechanical property profile. For example, the inventive BOPP films show higher stiffness, i.e. modulus of elasticity, and toughness, i.e. elongation at break, than films made with polypropylenes of the prior art.

The invention claimed is:

1. A biaxially oriented polypropylene (BOPP) film comprising a polypropylene (PP), wherein the biaxially oriented polypropylene (BOPP) film has
   a) a modulus of elasticity in transverse direction (TD) of at least 5 000 N/mm$^2$, and
   b) an elongation at break in machine direction (MD) of at least 170%, and
   wherein the polypropylene (PP) is a random polypropylene copolymer (C-PP) having
      i) a melting temperature ($T_m$) measured by differential scanning calorimetry (DSC) in the range of from 164 to 169° C.,
      ii) a xylene cold soluble fraction (XCS) determined at 25° C. according to ISO 16152 in the range of from 1.0 to 3.5 wt %, and
      iii) a content of ethylene units in the range of from 0.01 to 0.5 wt %, based on the total weight of the random polypropylene copolymer (C-PP).

2. The biaxially oriented polypropylene (BOPP) film according to claim 1, wherein the biaxially oriented polypropylene (BOPP) film has
   a) a modulus of elasticity in machine direction (MD) of at least 2 000 N/mm$^2$, and/or
   b) an elongation at break in transverse direction (TD) of at least 46%.

3. The biaxially oriented polypropylene (BOPP) film according to claim 1, wherein the biaxially oriented polypropylene (BOPP) film has a tensile strength in machine direction (MD) of at least 110 N/mm$^2$ and/or a tensile strength in transverse direction (TD) of at least 300 N/mm$^2$.

4. The biaxially oriented polypropylene (BOPP) film according to claim 1, wherein the polypropylene (PP) is a random polypropylene copolymer (C-PP) having

TABLE 5

Biaxially oriented polypropylene (BOPP) films

| | Tdraw'in TD | Tensile strength | | Elongation at break | | Modulus of Elasticity | |
|---|---|---|---|---|---|---|---|
| | | MD [N/mm$^2$] | TD [N/mm$^2$] | MD [%] | TD [%] | MD [N/mm$^2$] | TD [N/mm$^2$] |
| CE1 | 166° C. | 105 | 244 | 167 | 43 | 1787 | 3462 |
| IE1 | 164° C. | 178 | 415 | 186 | 48 | 2509 | 5557 |
| IE1 | 170° C. | 162 | 401 | 194 | 54 | 2493 | 5352 |
| IE2 | 164° C. | 147 | 365 | 220 | 55 | 2309 | 5257 |
| IE2 | 170° C. | 120 | 310 | 200 | 63 | 2100 | 5100 | a) a crystallization temperature (T$_c$) measured by differential scanning calorimetry (DSC) of at least 115° C., and/or
b) a melt flow rate MFR$_2$ (230° C.) measured according to ISO 1133 of ≤7.0 g/10min, and/or
c) an mmmm pentad content of ≥95.0% determined by $^{13}$C NMR spectroscopy, and/or
d) 2,1 erythro regio-defect content of below 1.0% determined by $^{13}$C NMR spectroscopy.

5. The biaxially oriented polypropylene (BOPP) film according to claim 1, wherein the polypropylene (PP) is a random polypropylene copolymer (C-PP) having
a) a crystallization temperature (T$_c$) measured by differential scanning calorimetry (DSC) of at least 118° C., and/or
b) a melt flow rate MFR$_2$ (230° C.) measured according to ISO 1133 of ≤7.0 g/10 min,
c) an mmmm pentad content of 95.0 to 98.0% determined by $^{13}$C NMR spectroscopy, and/or
d) 2,1 erythro regio-defect content of below 0.5% determined by $^{13}$C NMR spectroscopy.

6. The biaxially oriented polypropylene (BOPP) film according to claim 1, wherein the polypropylene (PP) is a random polypropylene copolymer (C-PP) having a comonomer corrected meso sequence length (MSL4') in the range of from 130 to 250 as determined by the following formula (IV)

$$MSL4'=(((1-(fE*5))*[mmmm])/(((1-(fE*5))*0.5*[mmmr])+(0.5*2*fE)))+4 \qquad (IV).$$

7. The biaxially oriented polypropylene (BOPP) film according to claim 1, wherein the polypropylene (PP) is a random polypropylene copolymer (C-PP) having a ratio of weight average molecular weight (M$_w$) to number average molecular weight (M$_n$) [M$_w$/M$_n$] of at least 4.0.

8. The biaxially oriented polypropylene (BOPP) film according to claim 7, wherein the polypropylene (PP) is a random polypropylene copolymer (C-PP) having a ratio of weight average molecular weight (M$_w$) to number average molecular weight (M$_n$) [M$_w$/M$_n$] of at least 5.0.

9. The biaxially oriented polypropylene (BOPP) film according to claim 1, wherein the polypropylene (PP) is a random polypropylene copolymer (C-PP) having a polydispersity index of ≥2.5.

10. The biaxially oriented polypropylene (BOPP) film according to claim 1, wherein the biaxially oriented polypropylene (BOPP) film has
a) a draw ratio in machine direction (MD) of ≥3.0 and/or
b) a draw ratio in transverse direction (TD) of ≥6.0.

11. The biaxially oriented polypropylene (BOPP) film according to claim 10, wherein the biaxially oriented polypropylene (BOPP) film has
a) a draw ratio in machine direction (MD) of ≥4.0, and/or
b) a draw ratio in transverse direction (TD) of ≥7.0.

12. A process for the preparation of a biaxially oriented polypropylene (BOPP) film according to claim 1, the process comprising at least the steps of
i) providing a polypropylene (PP) which is a random polypropylene copolymer (C-PP) having
a) a crystallization temperature (T$_c$) measured by differential scanning calorimetry (DSC) of at least 115° C., and/or
b) a melt flow rate MFR$_2$ (230° C.) measured according to ISO 1133 of ≤7.0 g/10 min, and/or
c) an mmmm pentad content of ≥95.0% determined by $^{13}$C NMR spectroscopy, and/or
d) 2,1 erythro regio-defect content of below 1.0% determined by $^{13}$C NMR spectroscopy, and
ii) stretching the polypropylene (PP) of step i) in machine direction (MD) and transverse direction (TD), wherein the stretching in machine direction (MD) and transverse direction (TD) is carried out in consecutive steps.

13. The process according to claim 12, wherein the polypropylene (PP) has
a) a drawing temperature (T$_{draw'}$) when drawn in transverse direction in the range of the inequation (II), $$Tm-25 \leq Tdraw' \leq Tm+10 \qquad (II),$$

wherein
Tdraw' is the drawing temperature (T$_{draw'}$) in ° C. of the first segment of the drawing zone (DZT) in the oven where the polypropylene (PP) is drawn in transverse direction, wherein further this first segment of the drawing zone (DZT) is defined as the zone where the draw ratio of the drawn polypropylene (PP) is at least 1.1; and
Tm is the melting temperature (T$_m$) of the polypropylene (PP) in ° C.;
and optionally
b) a drawing temperature (T$_{draw''}$) when drawn in transverse direction in the range of the inequation (III), $$Tm \leq Tdraw'' \leq Tm+18 \qquad (III),$$

wherein
Tdraw" is the drawing temperature (T$_{draw''}$) in ° C. of the heating zone (HZT) in the oven where the polypropylene (PP) is drawn in transverse direction, wherein further the heating zone (HZT) is the zone upstream to the drawing zone (DZT); and
Tm is the melting temperature (T$_m$) of the polypropylene (PP) in ° C.

14. The process according to claim 12, wherein the polypropylene (PP) has a drawing temperature (T$_{draw}$) when stretched in machine direction in the range of the inequation (I)

$$Tm-50 \leq Tdraw \leq Tm-15 \qquad (I),$$

wherein
Tdraw is the drawing temperature (T$_{draw}$) in ° C., wherein the drawing temperature (T$_{draw}$) is defined as the temperature (in ° C.) of the first roll (R1) of two successive rolls (R1, R2) of all rolls in the oven consecutively arranged in machine direction where the polypropylene (PP) is drawn in machine direction, wherein further said two successive rolls (R1, R2) when locking in machine direction have as the first pair of successive rolls for the first time a roll speed difference of at least 20 m/min; and
Tm is the melting temperature (T$_m$) of the polypropylene (PP) in ° C.

15. The process according to claim 12, wherein step b) is carried out in that the polypropylene (PP) of step a) is stretched
a) in machine direction (MD) with a draw ratio of ≥3.0 and/or
b) in transverse direction (TD) with a draw ratio of ≥6.0.

16. An article comprising a biaxially oriented polypropylene (BOPP) film as defined in claim 1.

* * * * *